US012676388B2

(12) United States Patent
Ruppin

(10) Patent No.: US 12,676,388 B2
(45) Date of Patent: Jul. 7, 2026

(54) RECHARGEABLE BATTERY WITH MOVABLE ELECTRODE

(71) Applicant: Arthur Oded Ruppin, Ringwood, NJ (US)

(72) Inventor: Arthur Oded Ruppin, Ringwood, NJ (US)

( * ) Notice: Subject to any disclaimer, the term of this patent is extended or adjusted under 35 U.S.C. 154(b) by 916 days.

(21) Appl. No.: 17/980,747

(22) Filed: Nov. 4, 2022

(65) Prior Publication Data

US 2024/0055734 A1      Feb. 15, 2024

Related U.S. Application Data

(60) Provisional application No. 63/474,392, filed on Aug. 15, 2022.

(51) Int. Cl.
H01M 50/533          (2021.01)
H01M 50/545          (2021.01)

(52) U.S. Cl.
CPC ....... H01M 50/533 (2021.01); H01M 50/545 (2021.01)

(58) Field of Classification Search
CPC ............. H01M 50/533; H01M 50/545; H01M 10/0565
See application file for complete search history.

(56) References Cited

U.S. PATENT DOCUMENTS 2,627,060 A      1/1953   Berg
3,357,864 A  *  12/1967   Huber ................... H01M 12/04
                                                          429/152

3,822,149 A       7/1974   Hale
4,696,103 A       9/1987   Behl et al.
5,686,810 A      11/1997   Yasui
6,299,998 B1 *  10/2001   Morris ................... H01M 12/08
                                                          429/69
9,413,179 B2      8/2016   Sorias et al.
10,998,738 B2     5/2021   Lee
2010/0143771 A1 *  6/2010   Jeong ................... H01M 10/651
                                                          429/62
2015/0091512 A1    4/2015   Mai
2016/0322674 A1   11/2016   Cazenobe
2022/0006147 A1    1/2022   Ko et al.
2022/0263060 A1 *  8/2022   Finegan ............. B23K 26/0643

FOREIGN PATENT DOCUMENTS

EP           1862799 A1  *  12/2007   ....... G01N 33/48728
TW           I283084 B   *   6/2007

OTHER PUBLICATIONS

TW I283084 MT (Year: 2007).*
Andersson, "Surface Phenomena in Li-Ion Batteries", Comprehensive Summaries of Uppsala Dissertations from the Faculty of Science and Technology 656, ISBN 91-554-5120-9., Uppsala University, Sweden, 2001.

* cited by examiner

*Primary Examiner* — Alexander Usyatinsky

(74) *Attorney, Agent, or Firm* — Myers Wolin, LLC

(57)                ABSTRACT

A rechargeable battery that is configured to bring two electrodes together when charging or discharging by moving one electrode towards the other and having the two electrodes be apart when not charging or discharging, thus lowering the intercalation of the battery as set up in the customary manner and likely having more charge/discharge cycles and faster charge time as likely the ion transfer throughput can be made larger and there may even be multiple and/or redundant ion transfer paths.

10 Claims, 12 Drawing Sheets

220

210

240

230

240

210

220

230

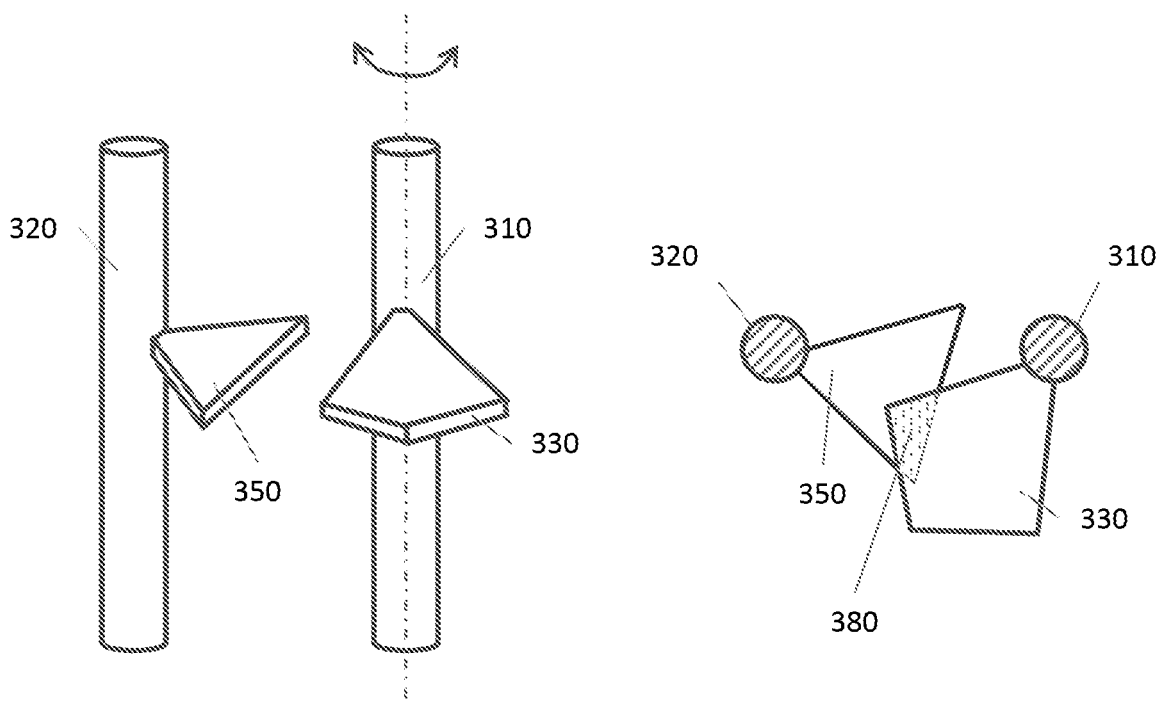
FIG. 3A
FIG. 3C
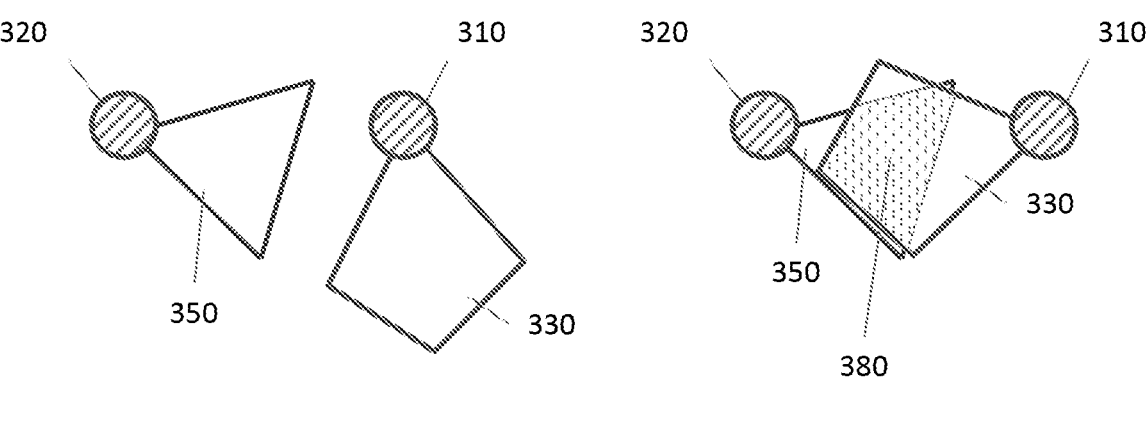
FIG. 3B
FIG. 3D

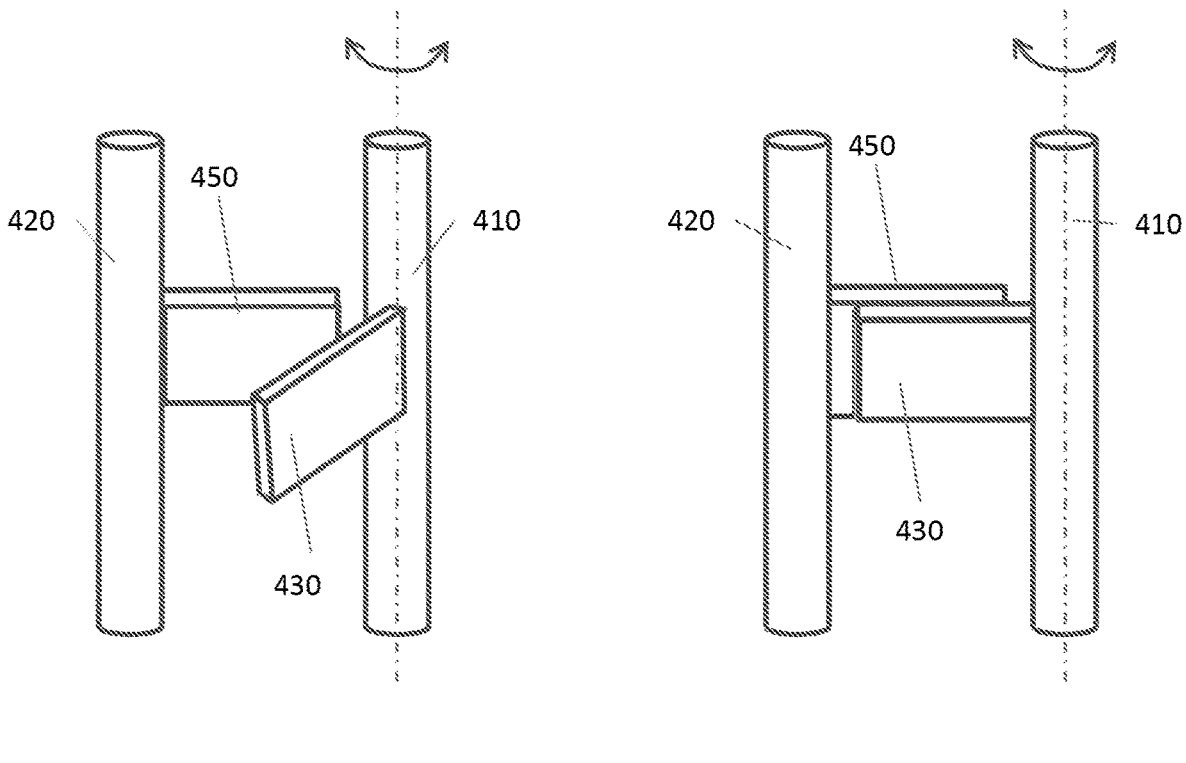
FIG. 4A                              FIG. 4C
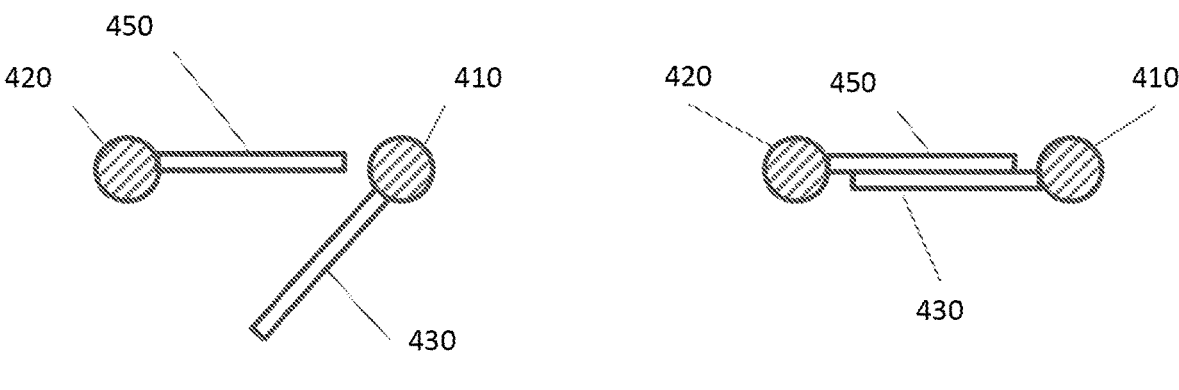
FIG. 4B                              FIG. 4D

520

510

550

530

520                    510

550                    530

520

510

550

530

520                    510

550                    530

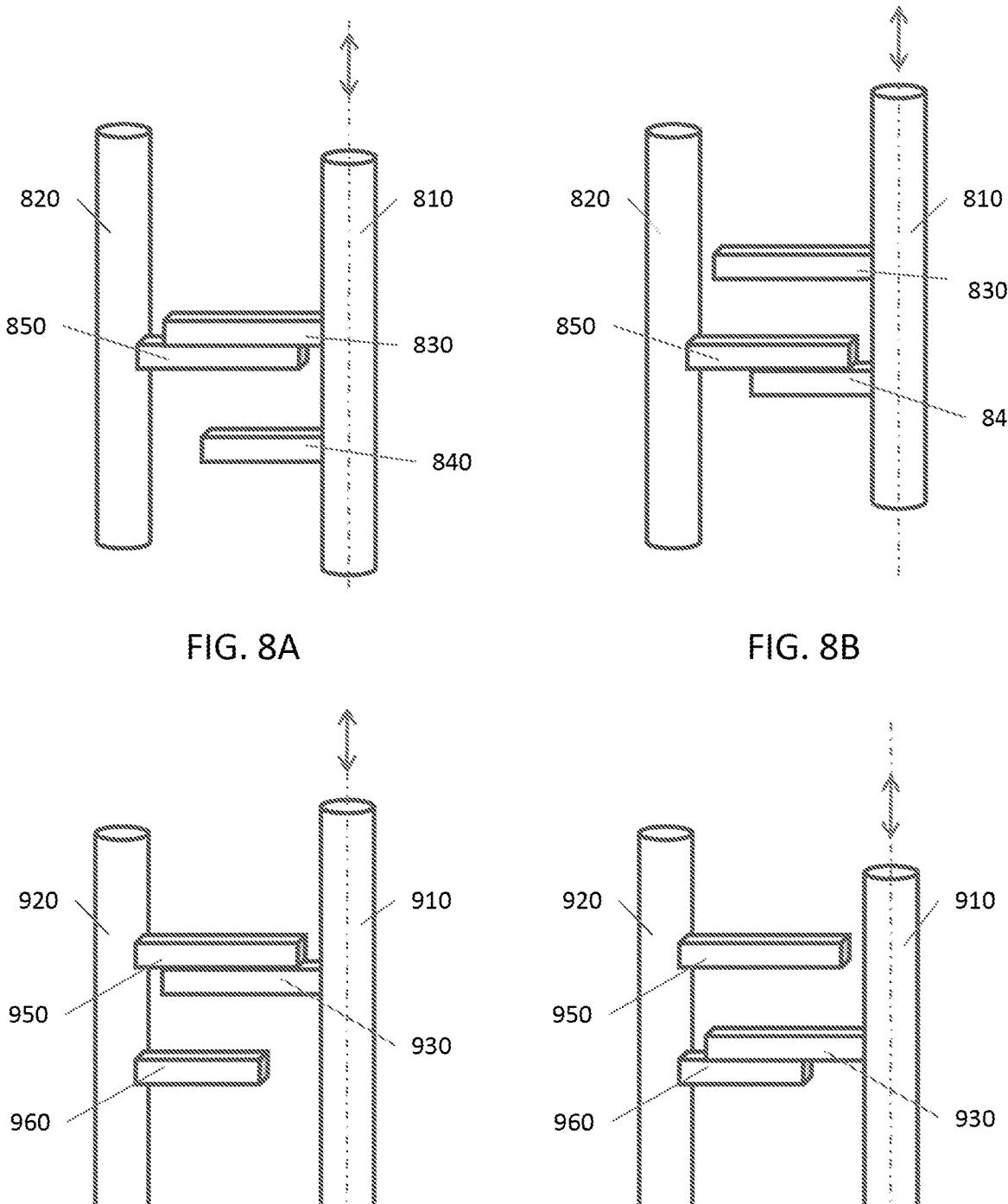
FIG. 8A                    FIG. 8B
FIG. 9A                    FIG. 9B

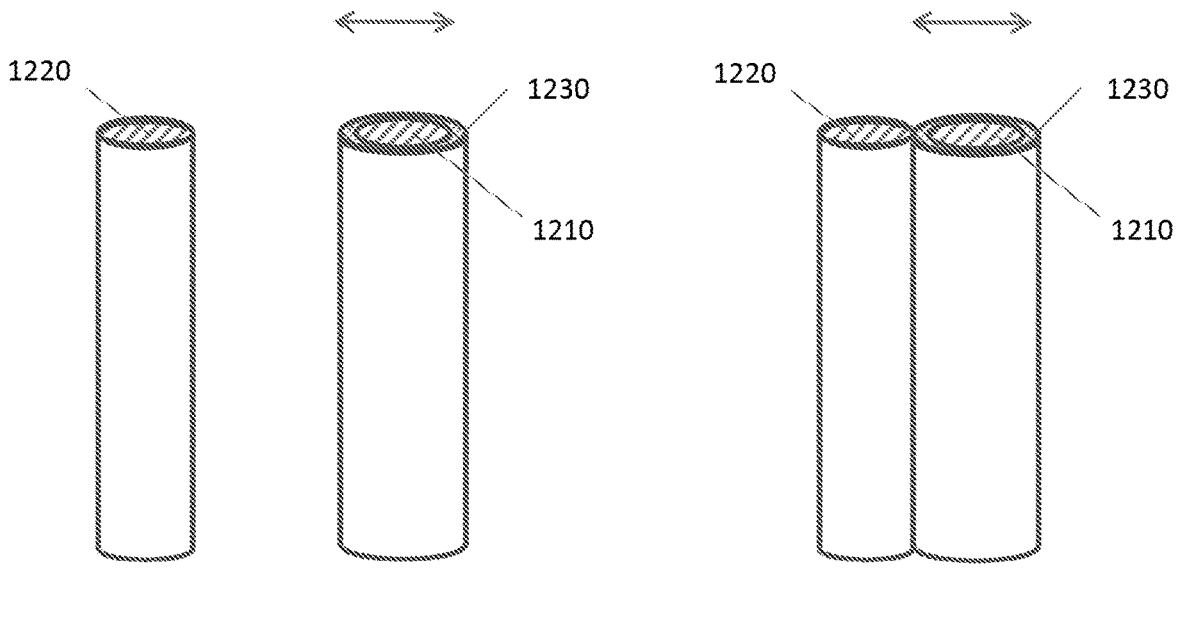
FIG. 12A                 FIG. 12C
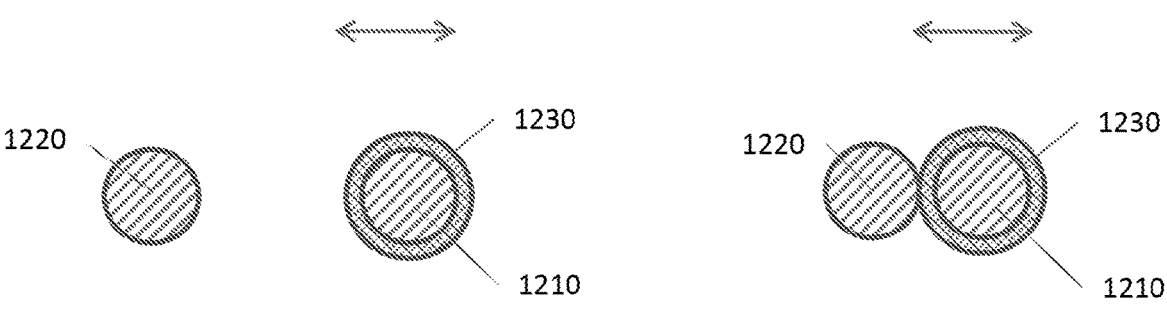
FIG. 12B                 FIG. 12D

RECHARGEABLE BATTERY WITH MOVABLE ELECTRODE

FIELD OF THE INVENTION

The present invention relates to rechargeable batteries, and more specifically to a rechargeable battery with a movable electrode.

BACKGROUND

As known in the art (see, for example, Wikipedia), a rechargeable battery is a type of electrical battery which can be charged, discharged into a load, and recharged many times, as opposed to a disposable or primary battery, which is supplied fully charged and discarded after use. A rechargeable battery includes one or more electrochemical cells, and it accumulates and stores energy through a reversible electrochemical reaction. Several different combinations of electrode materials and electrolytes are used, including lead-acid, zinc-air, nickel-cadmium (NiCd), nickel-metal hydride (NiMH), lithium-ion (Li-ion), lithium iron phosphate (LiFePO4), and lithium-ion polymer (Li-ion polymer).

As known in the art (see, for example, Wikipedia), the reactants in the electrochemical reactions in a lithium-ion cell are materials of anode and cathode, both of which are compounds containing lithium atoms. During discharge, an oxidation half-reaction at the anode produces positively charged lithium ions and negatively charged electrons. The oxidation half-reaction may also produce uncharged material that remains at the anode. Lithium ions move through the electrolyte, electrons move through the external circuit, and then they recombine at the cathode (together with the cathode material) in a reduction half-reaction. The electrolyte and external circuit provide conductive media for lithium ions and electrons, respectively, but do not partake in the electrochemical reaction. During discharge, electrons flow from the negative electrode (anode) towards the positive electrode (cathode) through the external circuit. The reactions during discharge lower the chemical potential of the cell, so discharging transfers energy from the cell to wherever the electric current dissipates its energy, mostly in the external circuit. During charging these reactions and transports go in the opposite direction: electrons move from the positive electrode to the negative electrode through the external circuit. To charge the cell the external circuit has to provide electric energy. This energy is then stored as chemical energy in the cell (with some loss, e.g., due to coulombic efficiency lower than 1). Both electrodes allow lithium ions to move in and out of their structures with a process called insertion (intercalation) or extraction (deintercalation), respectively.

If batteries are used repeatedly even without mistreatment, they lose capacity as the number of charge cycles increases, until they are eventually considered to have reached the end of their useful life. For example, in a lithium-ion type rechargeable battery, some reactive lithium metal can be formed on charging, which is no longer available to participate in the next discharge cycle, and this process reduces the cycling life. Even if the battery is not being charged, such undesirable chemical processes can still slowly take place via an internal stray current because the electrolyte inside the battery provides a permanent ion exchange path between the electrodes. Furthermore, improper storage or installation of the rechargeable battery may accidentally create a short circuit which could cause severe damage to the rechargeable battery or even a fire.

Therefore, there is a long-felt need for a rechargeable battery that does not have the above shortcomings that plague the current rechargeable batteries in the market.

SUMMARY

An embodiment of the present invention provides a rechargeable battery including: a first electrode; and a second electrode, the first and second electrode being spaced apart by a first distance; wherein the first electrode is rotatable about a longitudinal axis of the first electrode; and wherein the first electrode includes a first ion transfer region that extends from the longitudinal axis of the first electrode to a second distance in a radial direction, the second distance being larger than the first distance; wherein ion transfer between the first and second electrodes is allowed when the first ion transfer region connects with the second electrode, the connection being established by rotating the first electrode to an angle.

An embodiment of the present invention provides a rechargeable battery including: a first electrode; and a second electrode, the first and second electrode being spaced apart by a first distance; wherein the first electrode is translatable along a first direction; and wherein the first electrode includes a first ion transfer region; wherein ion transfer between the first and second electrodes is allowed when the first ion transfer region connects with the second electrode, the connection being established by translating the first electrode to a second distance.

An embodiment of the present invention provides a rechargeable battery including: a first electrode; and a second electrode, the first and second electrode being spaced apart by a first distance; wherein the first electrode includes a plurality of ion transfer regions, each ion transfer region being independently rotatable about a longitudinal axis of the first electrode; wherein ion transfer between the first and second electrodes is allowed when at least one of the plurality of ion transfer regions connects with the second electrode, the connection being established by rotating the at least one of the plurality of ion transfer regions by at least one of respective plurality of angles.

BRIEF DESCRIPTION OF THE DRAWINGS

FIGS. 3A and 3B are respectively perspective and top views of a disconnected ion transfer path of a rechargeable battery according to an embodiment, and FIGS. 3C and 3D are respectively top views of a first connected ion transfer path and a second connected ion transfer path of a rechargeable battery according to an embodiment.

FIGS. 4A and 4B are respectively perspective and top views of a disconnected ion transfer path of a rechargeable battery according to an embodiment, and FIGS. 4C and 4D are respectively perspective and top views of a connected ion transfer path of a rechargeable battery according to an embodiment.

FIGS. 8A and 8B are respectively perspective views of a first connected ion transfer path and a second connected ion transfer path of a rechargeable battery according to an embodiment.

FIGS. 9A and 9B are respectively perspective views of a first connected ion transfer path and a second connected ion transfer path of a rechargeable battery according to an embodiment.

FIGS. 12A and 12B are respectively perspective and top views of a disconnected ion transfer path of a rechargeable battery according to an embodiment, and FIGS. 12C and 12D are respectively perspective and top views of a connected ion transfer path of a rechargeable battery according to an embodiment.

DETAILED DESCRIPTION OF THE PREFERRED EMBODIMENTS

Figures 1A, 1C:
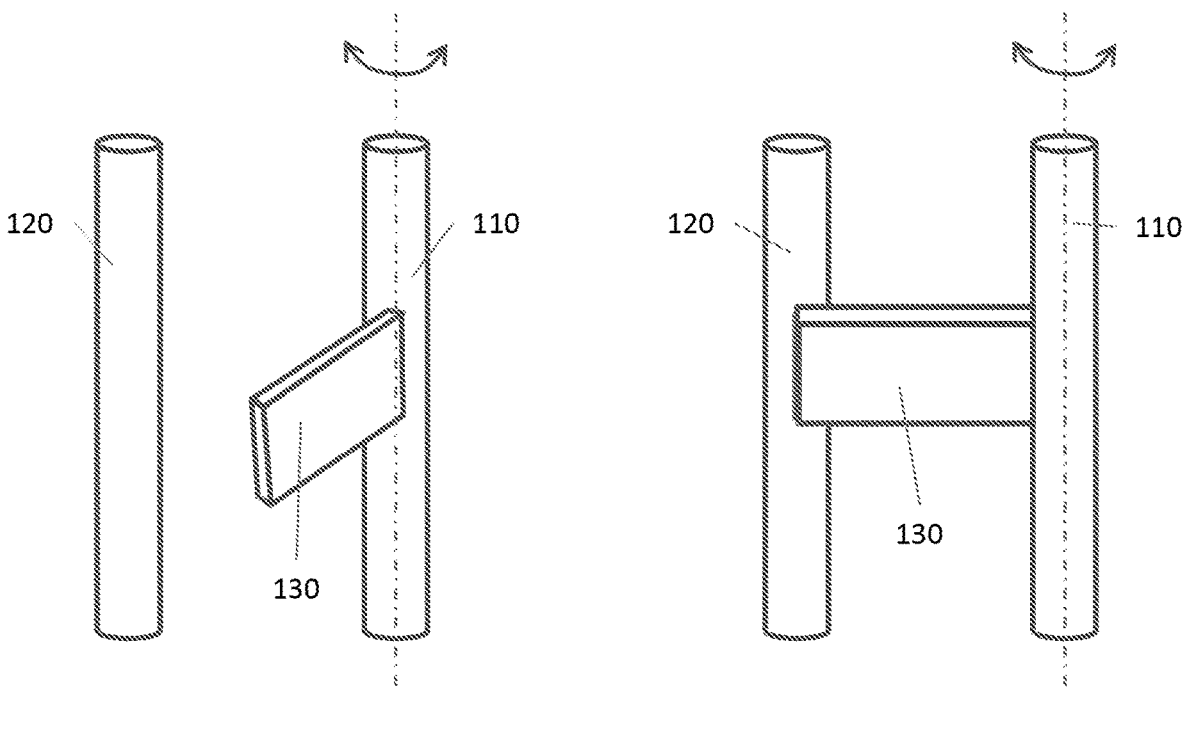
FIGS. 1A and 1B are respectively perspective and top views of a disconnected ion transfer path of a rechargeable battery according to an embodiment.
FIGS. 1C and 1D are respectively perspective and top views of a connected ion transfer path of a rechargeable battery according to an embodiment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

As discussed above, in a typical rechargeable battery, the electrodes are immersed in an electrolyte that provides a constant ion transfer path between the electrodes. In contrast, a rechargeable according to an embodiment of the present invention has a switchable ion transfer path that can be turned on and off, and in some embodiments the width/size (i.e., throughput) of the ion transfer path can be adjusted. An embodiment of the present invention provides a rechargeable battery that is configured to bring two electrodes together when charging or discharging by moving one electrode towards the other (like clapping hands or banging cymbals) and having the two electrodes be apart when not charging or discharging, thus lowering the intercalation of the battery as set up in the customary manner and likely having more charge/discharge cycles and faster charge time as likely the ion transfer throughput can be made larger and there may even be multiple and/or redundant ion transfer paths.

Figures 1B, 1D:
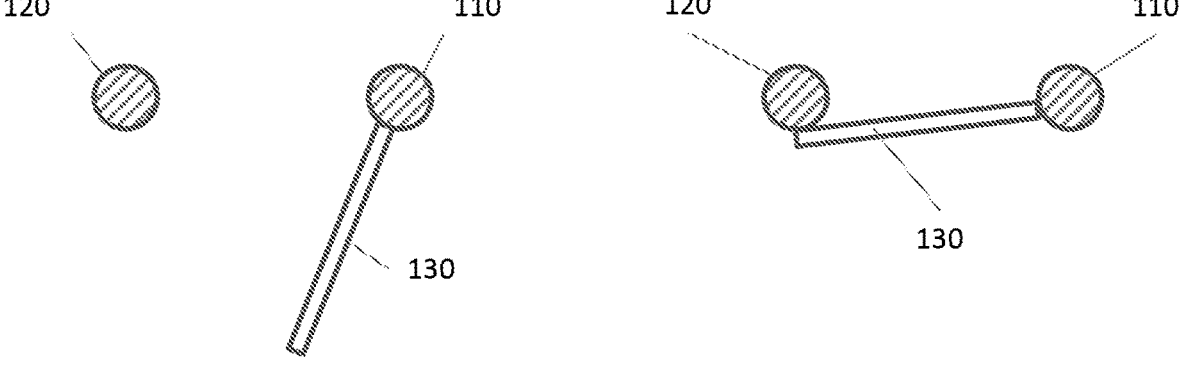

In an embodiment shown in FIGS. 1A-1D, a first electrode 110 is spaced apart from a second electrode 120. The first electrode 110 is rotatable about an axis, and includes an ion transfer region 130 that extends radially from the rotational axis. The extension of the ion transfer region is larger than the distance between the two electrodes. In a disconnected state as shown in FIGS. 1A and 1B, the ion transfer region 130 is not in contact with the second electrode 120, and thus no ion transfer can take place. In a connected state as shown in FIGS. 1C and 1D, the first electrode 110 is rotated by an angle that brings the ion transfer region 130 in contact with the second electrode 120, and thus ion transfers can take place. Thus, by rotating the first electrode 110, the ion transfer path can be turned on and off.

Note that an ion transfer region includes a medium that facilitates movements of ions. For example, the medium is an electrolyte that may be in solid or gel form, e.g., ceramic solid electrolytes, polymer gel electrolytes, or plasticized polymer electrolytes. It is understood that the choice of the medium depends also on the compositions of the electrodes.

Note that the electrolyte is not a perfect barrier (when the battery is not charged/discharged), and without an electrolyte, the movement of ions can be faster, with less heat generating, as the electrolyte adds friction. As discussed later in the present disclosure, the ion transfer region may be made from the same material as the electrode, and may not need to include any electrolyte materials. For example, the ion transfer region may be a film formed on the surface of the electrode itself during charging, and this film functions as an ionic conductor that allows ions to be transported through the film.

Figure 2A:
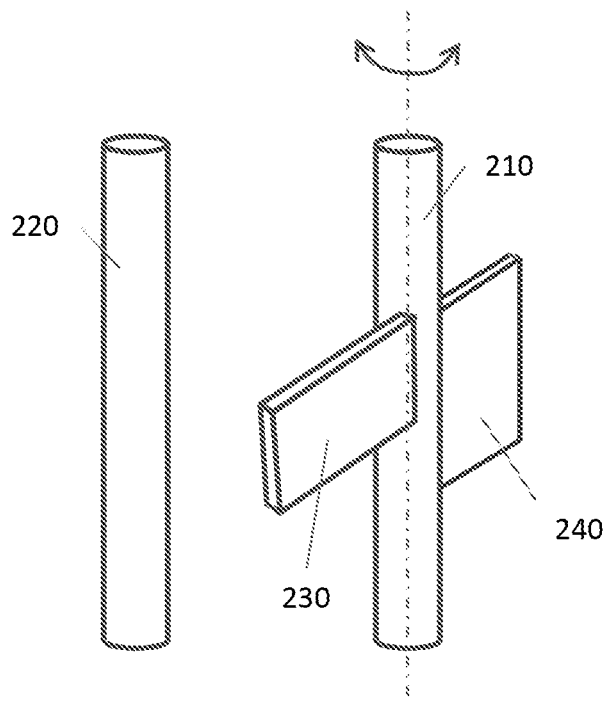
FIGS. 2A and 2B are respectively perspective and top views of a disconnected ion transfer path of a rechargeable battery according to an embodiment.
Figure 2B:
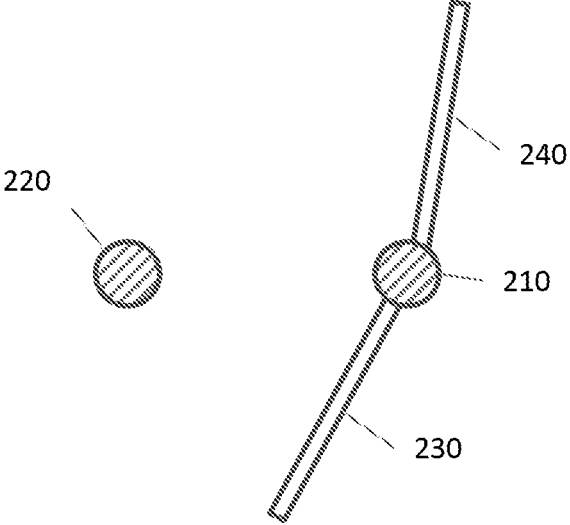
Figure 2C:
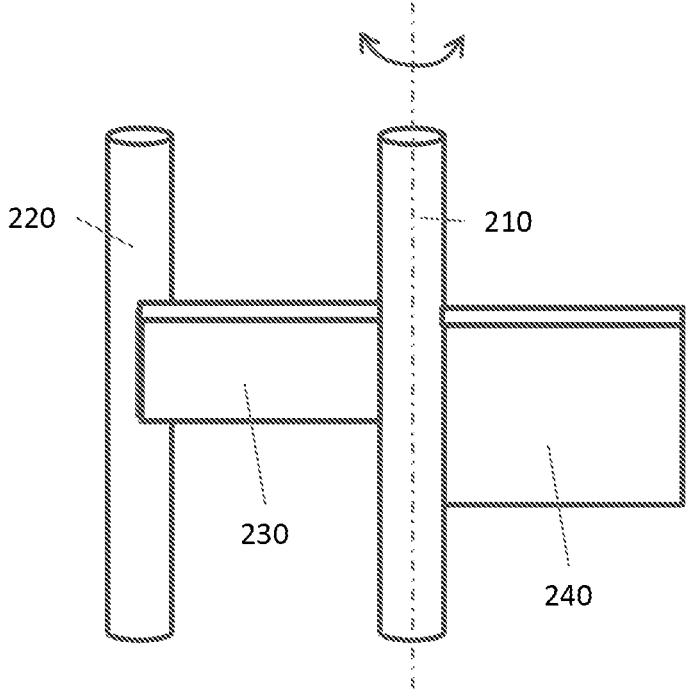
FIGS. 2C and 2D are respectively perspective and top views of a first connected ion transfer path of a rechargeable battery according to an embodiment.
Figure 2D:
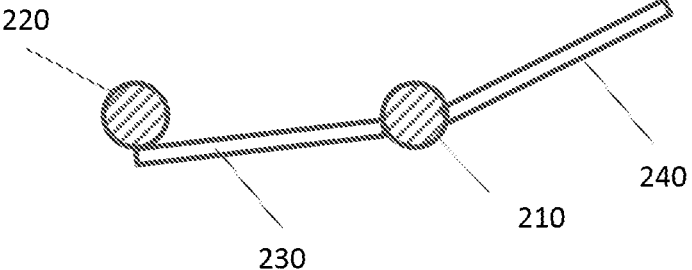
Figure 2E:
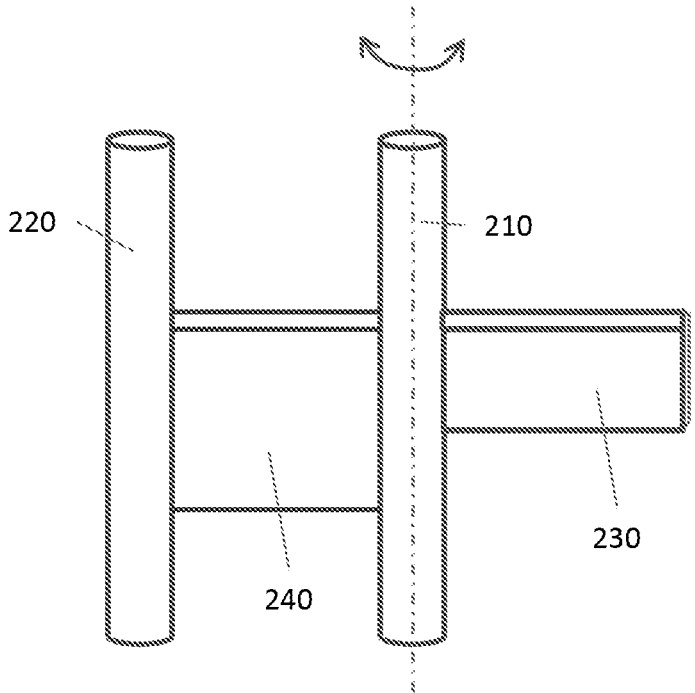
FIGS. 2E and 2F are respectively perspective and top views of a second connected ion transfer path of a rechargeable battery according to an embodiment.
Figure 2F:
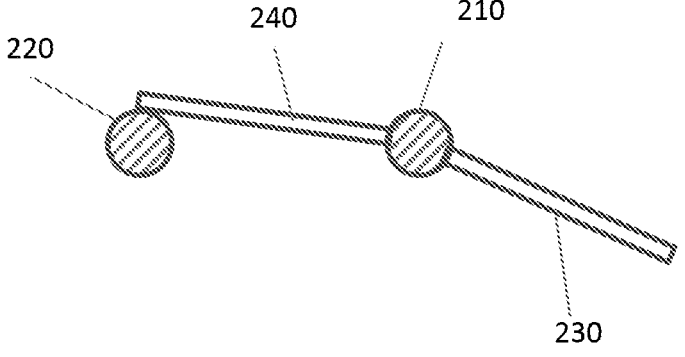

In an embodiment shown in FIGS. 2A-2F, a first electrode 210 is spaced apart from a second electrode 220. The first electrode 210 is rotatable about an axis, and includes a first ion transfer region 230 that extends radially from the rotational axis and a second ion transfer region 240 that extends radially from the rotational axis in a different direction from that of the first transfer religion. The size of the first ion transfer region 230 is different from the size of the second ion transfer region 240. In a disconnected state as shown in FIGS. 2A and 2B, the first and second ion transfer regions 230 and 240 are not in contact with the second electrode 220, and thus no ion transfer can take place. In a first connected state as shown in FIGS. 2C and 2D, the first electrode 210 is rotated by a first angle that brings the first ion transfer region 230 in contact with the second electrode 220. In a second connected state as shown in FIGS. 2E and 2F, the first electrode 210 is rotated by a second angle that brings the second ion transfer region 240 in contact with the second electrode 220. Thus, by rotating the first electrode 210 by different angles, the ion transfer path can be turned on and off, and the width/size of the ion transfer path can also be selected. Note that the angle between the first and second ion transfer regions can be any angle larger than 0 degree and less than 360 degrees.

In an embodiment shown in FIGS. 3A-3D, a first electrode 310 is spaced apart from a second electrode 320. The first electrode 310 is rotatable about an axis, and includes a first ion transfer region 330 that extends radially from the rotational axis. The second electrode 320 includes a second ion transfer region 350 that extends radially from an axis of the second electrode 320. In a disconnected state as shown in FIGS. 3A and 3B, the first and second ion transfer regions 330 and 350 are not in contact with each other, and thus no ion transfer can take place. Note that the first and second transfer regions 330 and 350 are of planar shape, and the height of a bottom surface of one transfer region is the same as the height of a top surface of another transfer region (i.e., these surfaces are coplanar), so that when the first electrode 310 is rotated by a first and second angles as shown in FIGS. 3C and 3D respectively, different areas of the bottom surface of the one transfer region make contacts with corresponding portions of the top surface of the other transfer region. Since the area of the overlapping region 380 depends on the angle of rotation, the width/size of the ion transfer path is also adjustable.

Note that the contact surface may be in different orientation, for example, vertical. In an embodiment shown in FIGS. 4A-4D, a first electrode 410 is spaced apart from a second electrode 420. The first electrode 410 is rotatable about a first axis, and includes a first ion transfer region 430 that extends radially from the rotational axis. The second electrode 420 includes a second ion transfer region 450 that extends radially from the rotational axis. In a disconnected state as shown in FIGS. 4A and 4B, the first ion transfer region 430 is not in contact with the second ion transfer region 450, and thus no ion transfer can take place. In a connected state as shown in FIGS. 4C and 4D, the first electrode 410 is rotated by a first angle that brings the ion transfer region 430 in contact with the second ion transfer region 450, and thus ion transfers can take place. Thus, by rotating both the first and second electrodes, the ion transfer path can be turned on and off.

Figure 5A:
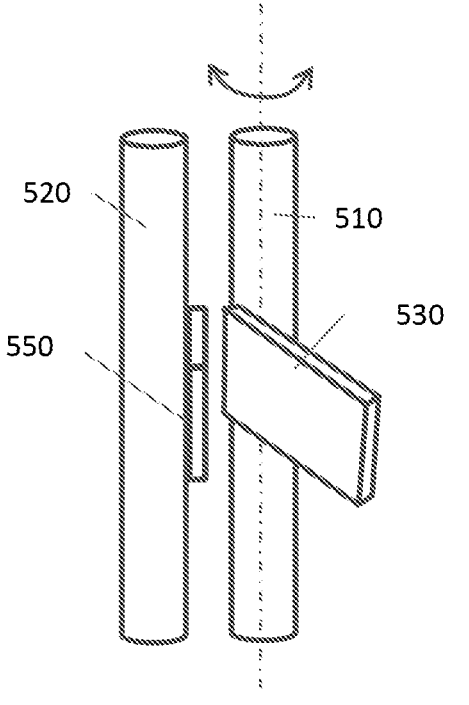
FIGS. 5A and 5B are respectively perspective and top views of a disconnected ion transfer path of a rechargeable battery according to an embodiment.
Figure 5B:
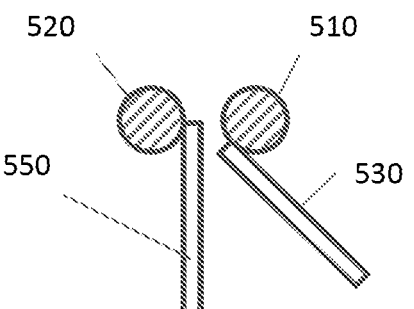
Figure 5C:
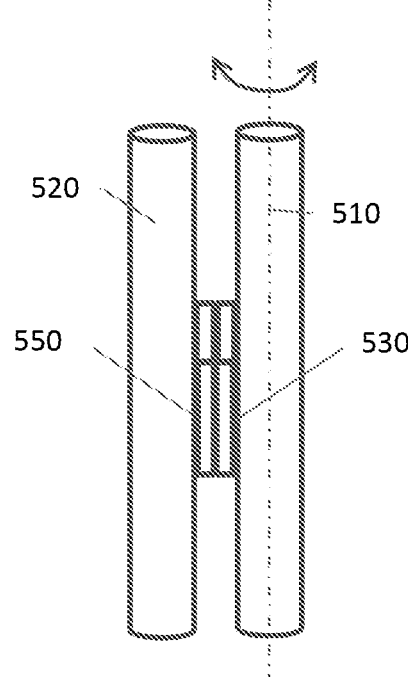
FIGS. 5C and 5D are respectively perspective and top views of a connected ion transfer path of a rechargeable battery according to an embodiment.
Figure 5D:
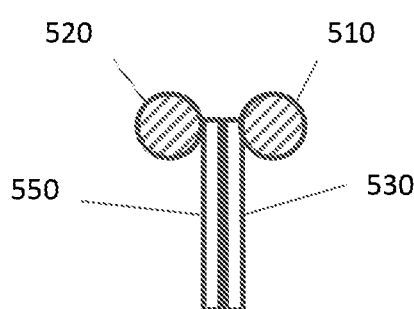

Similar to the embodiment shown in FIGS. 4A-4D, in an embodiment as shown in FIGS. 5A-5D, a first electrode 510 is spaced apart from a second electrode 520. In this case, the spacing between the first and second electrodes is smaller. The first electrode 510 is rotatable about a first axis, and includes a first ion transfer region 530 that extends radially from the rotational axis. The second electrode 520 includes a second ion transfer region 550 that extends radially from the rotational axis. In a disconnected state as shown in FIGS. 5A and 5B, the first ion transfer region 530 is not in contact with the second ion transfer region 550, and thus no ion transfer can take place. In a connected state as shown in FIGS. 5C and 5D, the first electrode 510 is rotated by a first angle that brings the ion transfer region 530 in contact with the second ion transfer region 550, and thus ion transfers can take place. In this embodiment, the rotating the first and second electrodes mimics the clapping hands.

Figures 6A, 6B, 7A, 7B:
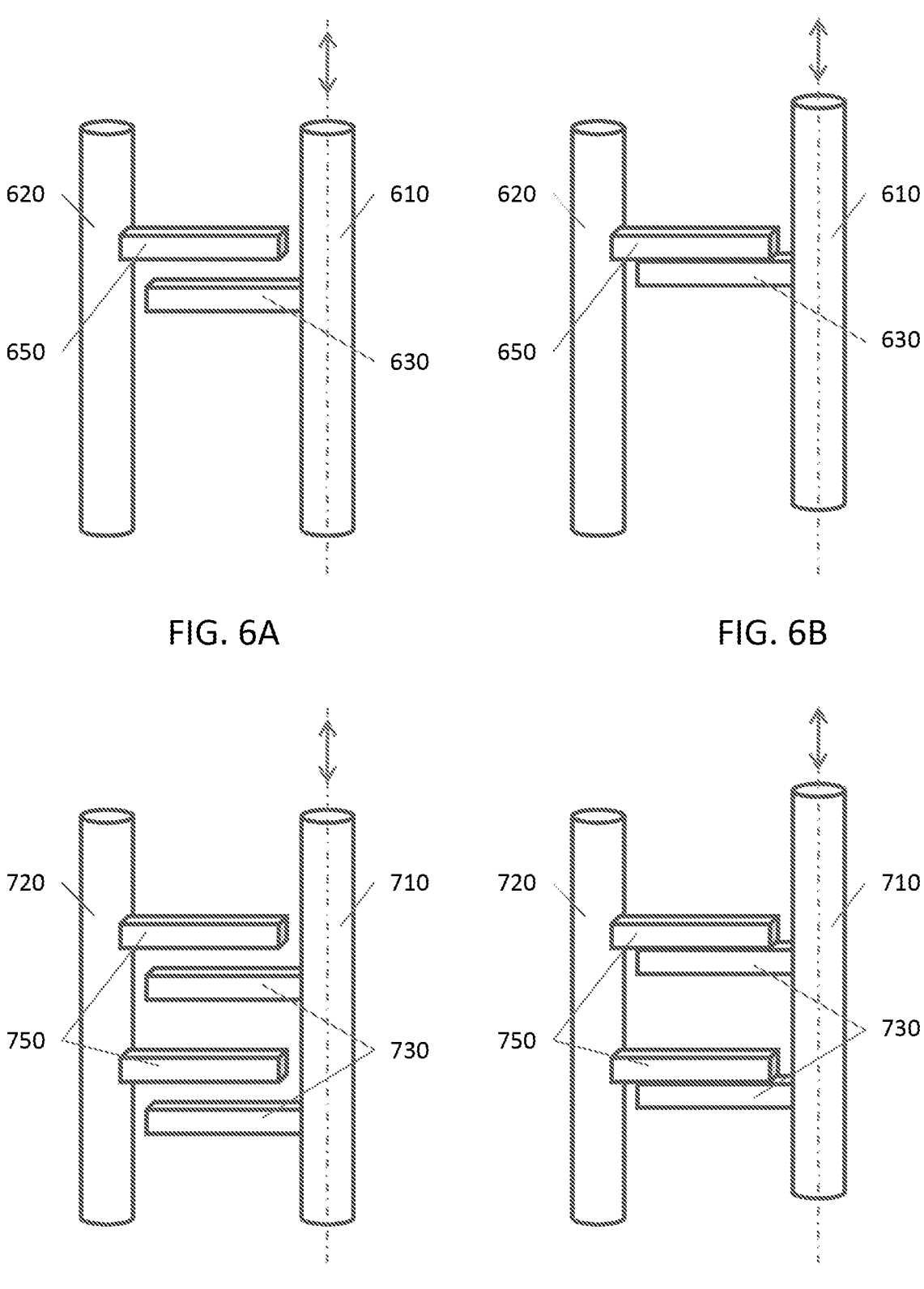
FIGS. 6A and 6B are respectively perspective views of a disconnected ion transfer path and a connected ion transfer path of a rechargeable battery according to an embodiment.
FIGS. 7A and 7B are respectively perspective views of a disconnected ion transfer path and a connected ion transfer path of a rechargeable battery according to an embodiment.

Note that the electrode can be translated in one or more directions to establish an ion transfer path. In an embodiment shown in FIGS. 6A and 6B, a first electrode 610 is spaced apart from a second electrode 620. The first electrode 610 is translatable along an axis (e.g., vertical axis), and includes a first ion transfer region 630 that extends towards the second electrode 620. The second electrode 620 includes a second ion transfer region 650 that extends towards the first electrode 610 and is parallel to the first ion transfer region 630. In a disconnected state as shown in FIG. 6A, the first and second ion transfer regions 630, 650 are not in contact with each other, and thus no ion transfer can take place. In a connected state as shown in FIG. 6B, the first electrode 610 is translated along its axis that brings the first ion transfer region 630 in contact with the second ion transfer region 650, and thus ion transfers can take place. Thus, by translating the first electrode 610, the ion transfer path can be turned on and off.

In an embodiment shown in FIGS. 7A and 7B, a first electrode 710 is spaced apart from a second electrode 720. The first electrode 710 is translatable along an axis, and includes a first plurality of parallel ion transfer regions 730 that extend towards the second electrode 720. The second electrode 720 includes a second plurality of parallel ion transfer regions 750 that extend towards the first electrode 710. Spacing between the first plurality of parallel ion transfer regions 730 matches a corresponding spacing between the second plurality of parallel ion transfer regions 750. In a disconnected state as shown in FIG. 7A, the first and second plurality of ion transfer regions 730, 750 are not in contact with each other, and thus no ion transfer can take place. In a connected state as shown in FIG. 7B, the first electrode 710 is translated along an axis that brings the first plurality of parallel ion transfer regions 730 in contact with the second plurality of parallel ion transfer regions 750, and thus ion transfers can take place. In this case, there are multiple ion transfer paths, which provide redundancy and/or increased throughput.

In an embodiment shown in FIGS. 8A and 8B, a first electrode 810 is spaced apart from a second electrode 820. The first electrode 810 is translatable along an axis, and includes a first ion transfer region 830 and a second ion transfer region 840 that extend towards the second electrode 820. The second electrode 820 includes a third ion transfer regions 850 that extends towards the first electrode 810. The length of the first ion transfer region 830 is different from the length of the second ion transfer region 840. In a disconnected state (not shown), none of the first and second ion transfer regions 830, 840 is in contact with the third ion transfer region 850, and thus no ion transfer can take place. In a first connected state as shown in FIG. 8A, the first electrode 810 is translated in a first direction along an axis that brings the first ion transfer regions 830 in contact with the third ion transfer regions 850, and thus ion transfers can take place. In a second connected state as shown in FIG. 8B, the first electrode 810 is translated in a second direction along an axis that brings the second ion transfer regions 840 in contact with the third ion transfer regions 850, and thus ion transfers can take place. Since the lengths of the first and second ion transfer regions 830, 840 are different, their respective areas of contact with the third ion transfer region 850 are different. Thus, by translating the first electrode 810 along an axis in different directions, the ion transfer path can be turned on and off, and the width/size of the ion transfer path can also be selected.

In an embodiment shown in FIGS. 9A and 9B, a first electrode 910 is spaced apart from a second electrode 920. The first electrode 910 is translatable along an axis, and includes a first ion transfer region 930 that extends towards the second electrode 920. The second electrode 920 includes a second ion transfer region 950 and a third ion transfer region 960 that extend towards the first electrode 910. The length of the second ion transfer region 950 is different from the length of the third ion transfer region 960. In a disconnected state (not shown), the first ion transfer region 930 is not in contact with any of the second and third ion transfer regions 950, 960, and thus no ion transfer can take place. In a first connected state as shown in FIG. 9A, the first electrode 910 is translated in a first direction along an axis that brings the first ion transfer region 930 in contact with the second ion transfer region 950, and thus ion transfers can take place. In a second connected state as shown in FIG. 9B, the first electrode 910 is translated in a second direction along an axis that brings the first ion transfer region 930 in contact with the third ion transfer region 960, and thus ion transfers can take place. Since the lengths of the second and third ion transfer regions 950, 960 are different, their respective areas of contact with the first ion transfer region 930 are different. Thus, by translating the first electrode 910 along an axis in different directions, the ion transfer path can be turned on and off, and the width/size of the ion transfer path can be selected.

Figures 10A, 10B:
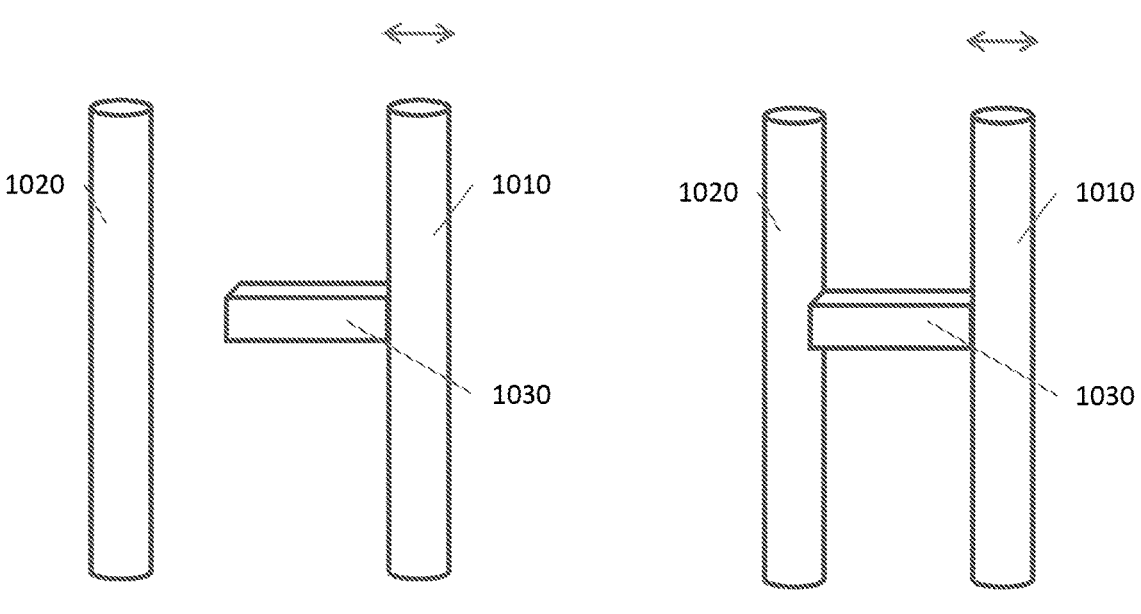
FIGS. 10A and 10B are respectively perspective views of a disconnected ion transfer path and a connected ion transfer path of a rechargeable battery according to an embodiment.

In an embodiment shown in FIGS. 10A and 10B, a first electrode 1010 is spaced apart from a second electrode 1020. The first electrode 1010 is translatable along a direction between the two electrodes (e.g., horizontal axis), and includes an ion transfer region 1030 that extends towards the second electrode 1020. In a disconnected state as shown in FIG. 10A, the ion transfer region 1030 is not in contact with the second electrode 1020, and thus no ion transfer can take place. In a connected state as shown in FIG. 10B, the first electrode 1010 is translated towards the second electrode 1020 that brings the first ion transfer region 1030 in contact with the second electrode 1020, and thus ion transfers can take place. Thus, by translating the first electrode 1010, the ion transfer path can be turned on and off. Note that in a variation of this embodiment (not shown), the first electrode includes multiple ion transfer regions to provide redundancy and/or increased throughput.

Figures 11A, 11B:
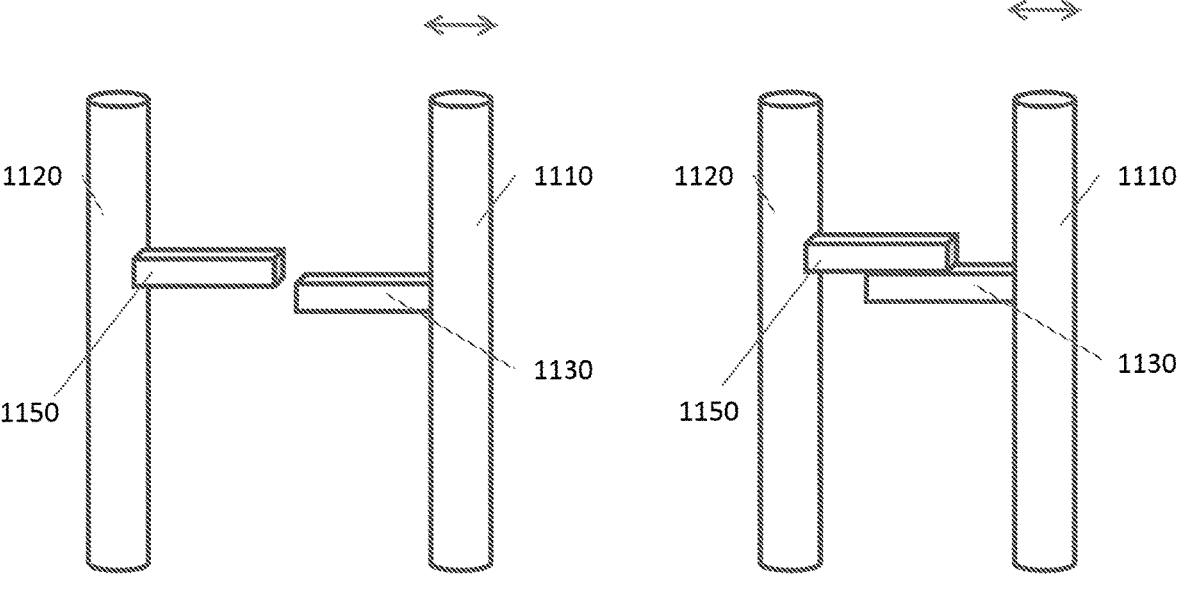
FIGS. 11A and 11B are respectively perspective views of a disconnected ion transfer path and a connected ion transfer path of a rechargeable battery according to an embodiment.

In an embodiment shown in FIGS. 11A and 11B, a first electrode 1110 is spaced apart from a second electrode 1120. The first electrode 1110 is translatable along a direction between the two electrodes (e.g., horizontal axis), and includes a first ion transfer region 1130 that extends towards the second electrode 1120. The second electrode 1120 includes a second ion transfer region 1150 that extends towards the first electrode 1110. In a disconnected state as shown in FIG. 11A, the ion transfer region 1130 is not in contact with the second ion transfer region 1150, and thus no ion transfer can take place. In a connected state as shown in FIG. 11B, the first electrode 1110 is translated towards the second electrode 1120 that brings the first ion transfer region 1130 in contact with the second ion transfer region 1150, and thus ion transfers can take place. The area of contact between the first and second ion transfer regions 1130, 1150 depends on the distance traveled by the first electrode 1110. Thus, by translating the first electrode 1110, the ion transfer path can be turned on and off, and the width/size of the ion transfer path is also adjustable. Note that in a variation of this embodiment (not shown), the first and second electrode include multiple corresponding ion transfer regions to provide redundancy and/or increased throughput.

In an embodiment shown in FIGS. 12A-12D, a first electrode 1210 is spaced apart from a second electrode 1220. The first electrode 1210 is translatable along a direction between the two electrodes, and the surface of the first electrode 1210 is coated with an ion transfer skin 1230 that facilitates movements of ions. For example, the first electrode 1210 may be coated with a skin 1230 containing electrolytes.

Furthermore, as mentioned earlier, coating the electrode with a material may not be necessary, as the surface of the electrode can be transformed into an ion transfer skin. For example, Li-ion batteries are assembled in their discharged state, with all lithium present in the positive electrode. During the first charge, carbonate-based electrolytes (solvents and salts) are reduced at the negative electrode (i.e. the carbon electrode) at a potential between ca. 1.5-0.7 V vs. Li/Li+(i.e., prior to any lithium intercalation), depending on the composition of the electrolyte. As a result, a surface film is formed consisting of a variety of solvent and salt reduction products. This film functions as an ionic conductor that allows Li+ ions to be transported through the film during the subsequent intercalation and deintercalation processes. The film is also an electronic insulator, which will prevent the continuous reduction of electrolyte as the film thickness reaches a certain limit. This limit has been defined intuitively as the thickness at which electron tunnelling from the graphite surface to the electrolyte is prevented (a few nm). The film then functions as a passivating layer on the graphite surface. It is most often referred to as a Solid Electrolyte Interphase (SEI) (see, for example, Andersson, A. 2001. Surface Phenomena in Li-Ion Batteries. Acta Universitatis Upsaliensis. *Comprehensive Summaries of Uppsala Dissertations from the Faculty of Science and Technology* 656. 60 pp. Uppsala. ISBN 91-554-5120-9). Since this film functions as an ionic conductor that allows Li+ ions to be transported through the film, in one embodiment, the first electrode 1010 comprises a solid electrolyte interphase (SEI) that acts as the ion transfer region 1030.

In a disconnected state as shown in FIGS. 12A and 12B, the ion transfer region 1230 is not in contact with the second electrode 1220, and thus no ion transfer can take place. In a connected state as shown in FIGS. 12C and 12D, the first electrode 1210 is moved towards the second electrode 1220 such that the ion transfer region 1230 (skin) is in contact with the second electrode 1220, and thus ion transfers can take place. Thus, by moving the first electrode 1210 towards and away from the second electrode 1220, the ion transfer path can be turned on and off.

In an embodiment, a portion of the first electrode itself may serve as the ion transfer region. When this portion of the first electrode makes contact with the second electrode, ions may transfer between the electrodes directly.

Figure 13A:
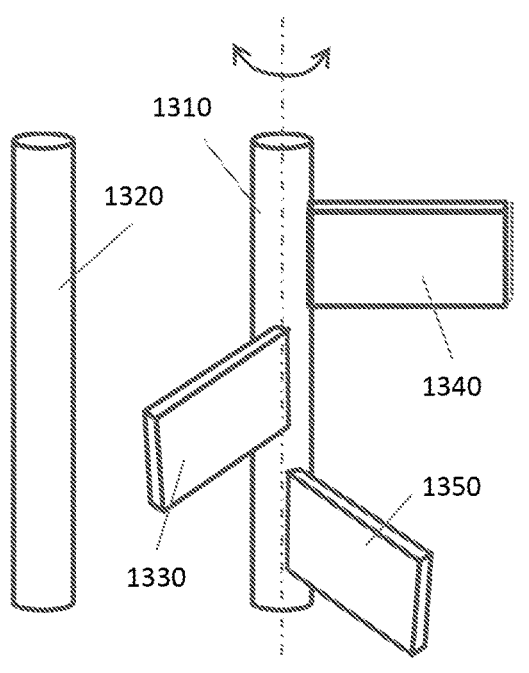
FIGS. 13A and 13B are respectively perspective and top views of a disconnected ion transfer path of a rechargeable battery according to an embodiment.
Figure 13B:
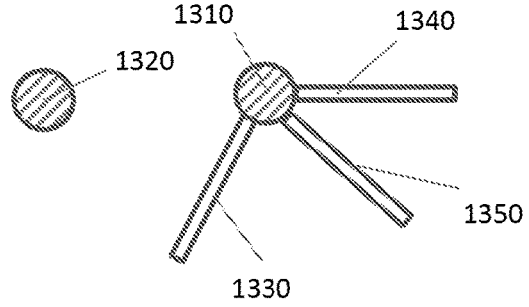
Figure 13C:
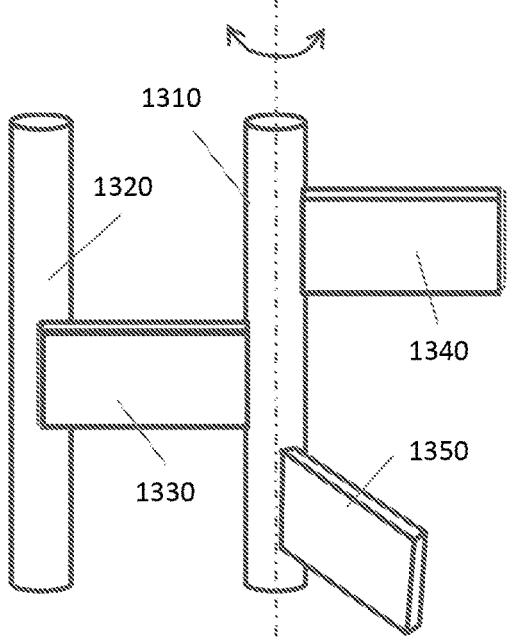
FIGS. 13C and 13D are respectively perspective and top views of a connected ion transfer path of a rechargeable battery according to an embodiment.
Figure 13D:
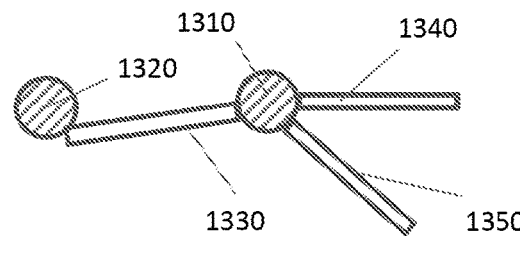

In an embodiment shown in FIGS. 13A-13D, a first electrode 1310 is spaced apart from a second electrode 1320. The first electrode 1310 includes a plurality of ion transfer regions 1330, 1340, 1350 that extend radially from a rotational axis. In this case, each of the plurality of ion transfer regions are independently rotatable about the axis of the first electrode 1310. The extensions plurality of ion transfer regions are larger than the distance between the two electrodes. In a disconnected state as shown in FIGS. 13A and 13B, none of the plurality of ion transfer regions 1330, 1340, 1350 is in contact with the second electrode 120, and thus no ion transfer can take place. In a connected state as shown in FIGS. 13C and 13D, one of the ion transfer regions 1330 is rotated by an angle that brings this individual ion transfer region 1330 in contact with the second electrode 1320, and thus ion transfers can take place. Note that in this example, the other ion transfer regions 1340, 1350 are not rotated. Since each of the plurality of ion transfer regions can be independently rotated, multiple ion transfer paths and/or combinations of ion transfer paths can be established. Thus, by rotating the plurality of ion transfer regions by respective angles, the ion transfer path can be turned on and off, and different throughputs can be achieved.

Note that although the above example discussions refer to Lithium-Ion batteries, it is understood that embodiments of the present invention can apply to other suitable metallic ions, such as LiFePO4, Tungsten-Ion, etc.

Note that although the movements shown in the above embodiments are associated with the first electrode for simplicity reasons, it should be understood that the illustrated movements are relative movements. It is understood that one or both of the first and second electrodes can move independently or cooperatively to achieve the desired relative motion.

The movement of the electrodes can be accomplished by different actuators known to a person of ordinary skill in the art. For example, the electrodes may be moved by a motor, electromagnet, etc. The actuator can be internal or external to the rechargeable battery. Furthermore, the actuator may be powered by the battery itself, or by an external power source.

Note that the above embodiments are non-limiting examples of connecting and disconnecting the ion transfer path. It is contemplated that one or both of the electrodes can be translated and/or rotated, such that a desired ion transfer path can be established according to the geometrical setup of the electrodes and ion transfer regions.

Note that the cross-section of the electrode does not have to be circular as shown in the example figures. It is understood that any suitable geometrical cross-section, such as square, ellipse, polygon, etc., can be used without deviating from the principal operation of the embodiments of the present invention.

While the present invention has been described at some length and with some particularity with respect to the several described embodiments, it is not intended that it should be limited to any such particulars or embodiments or any particular embodiment, but it is to be construed so as to provide the broadest possible interpretation in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. A rechargeable battery comprising:
   a first electrode; and
   a second electrode, the first and second electrode being spaced apart by a first distance;
   wherein the first electrode is rotatable about a longitudinal axis of the first electrode; and wherein the first electrode comprises a first ion transfer region that extends from the longitudinal axis of the first electrode to a second distance in a radial direction;
   wherein ion transfer between the first and second electrodes is allowed when the first ion transfer region connects with the second electrode, the connection being established by rotating the first electrode to an angle.

2. The rechargeable battery of claim 1, wherein the first electrode comprises a second ion transfer region that extends from the longitudinal axis of the first electrode in a direction different from that of the first ion transfer region, and the first and second ion transfer regions have different contact sizes with the second electrode;
   wherein the first ion transfer region connects with the second electrode when the first electrode is rotated by a first angle, and the second ion transfer region connects with the second electrode when the first electrode is rotated by a second angle;
   wherein a throughput of the ion transfer between the first and electrodes depends on the contact size.

3. The rechargeable battery of claim 1, wherein the second electrode comprises a second ion transfer region that extends from a longitudinal axis of the second electrode, and the first and second ion transfer regions are of horizontal planar shape, a top surface of one of the first and second ion transfer regions is coplanar with a bottom surface of the other one of the first and second ion transfer regions;
   wherein the first ion transfer region connects with the second ion transfer region when the first electrode is rotated by an angle within a range;
   wherein a throughput of the ion transfer between the first and electrodes depends on the angle of rotation within the range.

4. The rechargeable battery of claim 1, wherein the second electrode comprises a second ion transfer region that extends from the longitudinal axis of the second electrode to the first electrode in a radial direction;
   wherein the first and second ion transfer regions are of vertical planar shape;
   wherein ion transfer between the first and second electrodes is allowed when the first ion transfer region connects with the second ion transfer region, the connection being established by rotating the first electrode to a first angle.

5. The rechargeable battery of claim 1, wherein the first ion transfer region comprises a medium that allows movement of ions, the medium is selected from a group comprising ceramic solid electrolyte, polymer gel electrolyte, plasticized polymer electrolyte, and solid electrolyte interphase (SEI).

6. The rechargeable battery of claim 1, wherein the rotation of the first electrode is controlled by a motor or electromagnet.

7. A rechargeable battery comprising:
   a first electrode; and
   a second electrode, the first and second electrode being spaced apart by a first distance;
   wherein the first electrode comprises a plurality of ion transfer regions, each ion transfer region being independently rotatable about a longitudinal axis of the first electrode;
   wherein ion transfer between the first and second electrodes is allowed when at least one of the plurality of ion transfer regions connects with the second electrode, the connection being established by rotating the at least one of the plurality of ion transfer regions by at least one of respective plurality of angles.

8. The rechargeable battery of claim 7, wherein the plurality of ion transfer regions have different sizes.

9. The rechargeable battery of claim 7, wherein each of the plurality of ion transfer regions comprises a medium that allows movement of ions, the medium is selected from a group comprising ceramic solid electrolyte, polymer gel electrolyte, plasticized polymer electrolyte, and solid electrolyte interphase (SEI).

10. The rechargeable battery of claim 7, wherein rotations of the plurality of ion transfer regions are controlled by one or more motors or electromagnets.

* * * * *